(12) United States Patent
Welch et al.

(10) Patent No.: US 11,106,357 B1
(45) Date of Patent: Aug. 31, 2021

(54) LOW LATENCY TACTILE TELEPRESENCE

(71) Applicant: University of Central Florida Research Foundation, Inc., Orlando, FL (US)

(72) Inventors: Gregory Welch, Orlando, FL (US); Ryan McMahan, Orlando, FL (US); Gerd Bruder, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/175,949

(22) Filed: Feb. 15, 2021

(51) Int. Cl.
*G06F 3/0488* (2013.01)
*G06F 3/01* (2006.01)
*G06F 3/0484* (2013.01)

(52) U.S. Cl.
CPC .......... *G06F 3/04883* (2013.01); *G06F 3/014* (2013.01); *G06F 3/016* (2013.01); *G06F 3/04842* (2013.01)

(58) Field of Classification Search
CPC .... G06F 3/017; G06F 3/04883; G06F 3/0487; G06F 3/0488; G06F 3/04886; G06F 2203/04808; G06K 9/00335
See application file for complete search history.

(56) References Cited

U.S. PATENT DOCUMENTS

| | | | |
|---|---|---|---|
| 8,493,354 B1 * | 7/2013 | Birnbaum | G06F 3/016 345/173 |
| 9,058,728 B2 | 6/2015 | Fantauzza | |
| 9,134,796 B2 | 9/2015 | Lemmens et al. | |
| 10,311,686 B2 * | 6/2019 | Ullrich | H04M 19/047 |
| 10,488,929 B2 * | 11/2019 | Kim | A63F 13/424 |
| 10,599,222 B2 * | 3/2020 | Bench | G06F 21/31 |
| 10,653,366 B2 | 5/2020 | Levine | |
| 10,930,265 B2 * | 2/2021 | Rakshit | G06N 5/02 |
| 2007/0057913 A1 * | 3/2007 | Eid | G06F 3/016 345/156 |
| 2007/0063849 A1 | 3/2007 | Rosella et al. | |
| 2009/0193059 A1 * | 7/2009 | Wall | G06F 11/2094 |

(Continued)

OTHER PUBLICATIONS

Fong et al., Haptic Interfaces for Accessibilty, Health, and Enhanced Quality of Life, Springer 2020, Chapter 10, Intelligent Robotics and Immersive Displays for Enhancing Haptic Interaction in Physical Rehabilitation Environments, pp. 265-298.
Delazio et al., Force Jacket: Pneumatically-Actuated Jacket for Embodied Haptic Experiences, CHI 2018, Apr. 21-26, 2018, pp. 1-12.

(Continued)

*Primary Examiner* — William Lu
(74) *Attorney, Agent, or Firm* — Anton J. Hopen; Smith & Hopen, P. A.

(57) ABSTRACT

A system for remote tactile telepresence wherein an array of predefined touch gestures are abstracted into cataloged values and invoked either by pattern matching, by assigned name or visual indicia. A local and remote cache of the catalog reduces latency even for complicated gestures as only a gesture identifier needs to be transmitted to a haptic output destination. Additional embodiments translate gestures to different haptic device affordances. Tactile telepresence sessions are time-coded along with audiovisual content wherein playback is heard, seen, and felt. Another embodiment associates motion capture associated with the tactile profile so that remote, haptic recipients may see renderings of objects (e.g., hands) imparting vibrotactile sensations.

12 Claims, 9 Drawing Sheets

(56) References Cited

U.S. PATENT DOCUMENTS

| | | | | |
|---|---|---|---|---|
| 2010/0095250 | A1* | 4/2010 | Roberto | H04L 67/36 715/863 |
| 2011/0093820 | A1* | 4/2011 | Zhang | A63F 13/77 715/863 |
| 2013/0123570 | A1 | 5/2013 | Ly et al. | |
| 2013/0300644 | A1* | 11/2013 | Chen | G06F 3/017 345/156 |
| 2014/0025750 | A1* | 1/2014 | Dawar | H04M 1/72403 709/206 |
| 2014/0210756 | A1* | 7/2014 | Lee | G06F 3/04883 345/173 |
| 2017/0131772 | A1* | 5/2017 | Choi | G04G 21/08 |
| 2018/0203925 | A1* | 7/2018 | Aran | G06F 16/683 |
| 2018/0349373 | A1* | 12/2018 | Sauerwein, Jr. | G05B 19/0425 |
| 2019/0094981 | A1* | 3/2019 | Bradski | G06F 3/017 |
| 2019/0316912 | A1* | 10/2019 | Maggiore | G01C 21/206 |
| 2019/0354191 | A1* | 11/2019 | Reynolds | G06F 3/167 |
| 2020/0272324 | A1* | 8/2020 | Chanda | H04L 41/22 |
| 2020/0410237 | A1* | 12/2020 | Soryal | G06N 20/10 |
| 2021/0099547 | A1* | 4/2021 | Han | H04L 67/2842 |

OTHER PUBLICATIONS

Pezent et al., Tasbi: Multisensory Squeeze and Vibrotactile Wrist Haptics for Augmented and Virtual Reality, 2019 IEEE World Haptics Conference (WHC) Tokyo, Japan Jul. 9-12, 2019, pp. 1-6.
Yu et al., Skin-integrated wireless haptic interfaces for virtual and augmented reality, Nature, vol. 575, Nov. 12, 2019, pp. 473-493.
Tsetserukou, HaptiHug: A Novel Haptic Display for Communication of Hug over a Distance, Kappers et al. (Eds.): EuroHaptics 2010, pp. 336-343.
Singhal et al., Flex-N-Feel: Emotive Gloves for Physical Touch Over Distance, CSCW 2017, Feb. 25-Mar. 1, 2017, pp. 37-40.
Chan, "I Need a Hug Right Now": Affective Support Through Remote Touch Technology, 2019 8th International Conference on Affective Computing and Intelligent Interaction Workshops and Demos, pp. 40-44.
Haritaipan et al., Design of a Massage-Inspired Haptic Device for Interpersonal Connection in Long-Distance Communication, Advances in Human-Computer Interaction, Hindawi, vol. 2018, pp. 1-12.
Cheok et at., Huggy Pajama: Remote Hug System for Family Communication, Human-Robot Intimate Relationships, Springer Nature Switzerland AG 2019, pp. 33-75.

* cited by examiner

LOW LATENCY TACTILE TELEPRESENCE

FEDERALLY SPONSORED RESEARCH OR DEVELOPMENT

This invention was made with Government support under Grant No. 1564065 awarded by the National Science Foundation. The government has certain rights in the invention.

BACKGROUND OF THE INVENTION

1. Field of the Invention

This invention relates to the use of tactile-visual systems and methods for interactions between isolated users.

BRIEF SUMMARY OF THE INVENTION

This invention improves latency and usability in remote tactile telepresence sessions.

According to one embodiment, the method includes providing an electronic interface communicatively coupled to a local network, the electronic interface having a touchscreen input surface detecting tactile input by a user. This may be a tablet device such as those available under the brands APPLE IPAD, MICROSOFT SURFACE, or virtually any modern smartphone device. In response to detecting the tactile input, the device monitors the input using a gesture recognizer. A gesture recognizer decouples the logic for recognizing a sequence of tactile input (e.g., touches) and acts on that identification. The system receives a gesture pattern detected by the gesture recognizer and matches it to a unique profile within a first database catalog storing a plurality of gesture patterns. The first database catalog of gesture patterns is communicatively coupled to the electronic interface. From the first database catalog, a unique identifier value for the unique profile is returned. That unique identifier value is transmitted from the local network to a remote network.

A gesture pattern comprises one or more vector values that are tactilely imparted through a haptic device to provide a tactile sensation. The vectors may be one-, two- or three-dimensional. A one-dimensional gesture pattern comprises a straight-line stroke. A two-dimensional gesture pattern may comprise: (a) changes in direction on an X/Y coordinate plane; and/or (b) a one-dimensional vector with changes to intensity. A three-dimensional gesture may include X/Y coordinate movement with intensity values (e.g., light versus firm presses). Gesture patterns may also include speed of motion, which may be constant or variable (e.g., acceleration or deceleration). Finally, simple gesture patterns may be sequenced together to form more complex interactions that may span more than one addressable haptic device. By analogy, an alphabet of simple gestures may be combined into words, phrases, and sentences of increased length and complexity. An advantage of this approach is the modularization of simple gestures that are already stored in a catalog of preexisting patterns. Building more complex gesture patterns from simpler subunits conserves bandwidth, memory, processing and increases the consistency of the experience to both sender and recipient. Yet another advantage of modularizing gesture patterns into subunits is so that mapping to haptic device affordances need only to be performed on the subunits.

Once at the remote network, a second database catalog of gesture patterns is queried with the unique identifier value. An embodiment of the invention that reduces latency has the first and second database catalogs configured in a mirrored state, so there is a local (on-premise) cache of the same data. The same gesture pattern matched from the gesture recognizer on the electronic interface is retrieved from the second database catalog of gesture patterns. The gesture pattern is sent to a haptic device communicatively coupled to the remote network whereby the gesture pattern causes transducers on the haptic device to impart a mechanical force upon a surface; the mechanical force is arranged to match the gesture pattern.

An embodiment of the invention links the unique identifier value of a gesture pattern with a visual indicium (a TMOJI). The TMOJI is displayable as a selectable control on the touchscreen input service whereby selecting the TMOJI transmits the linked unique identifier value to the remote network causing the gesture pattern of the linked unique identifier value to be invoked by the haptic device. The abstraction of the tactile gesture pattern to a visual indicium enhances the ease of use and consistency of the haptic experience for the recipient. Furthermore, it reduces computing overhead as a vector-time-based pattern does not need to be either matched or translated locally. The TMOJI is associated with a preexisting gesture pattern and needs little bandwidth to transmit remotely to the haptic recipient.

In addition, or alternatively, to linking a gesture pattern to a visual indicium, the gesture pattern may be linked to a string of alphanumeric characters. This may simply be a description of the gesture (e.g., "soft arm pat" or "gentle stroke"). However, an embodiment of the invention provides another field for the gesture pattern linking it to grammar More specifically, in chat sessions or speech-to-text out, certain phrases like, "hope you feel better" automatically invoke or prompt for authorization, an associated gesture pattern. In another example, to get attention, a gesture pattern that produces soft tapping is associated with "are you there" or "hello?" phrases.

Some gesture patterns do not directly translate to the target haptic device hardware. For example, a user might wish to convey a bell-curve stroke to a remote haptic device. Such a pattern requires a haptic device with an X and Y axis affordance. For example, it would have a grid of transducers to convey the coordinates of the stroke vector. An embodiment of the invention translates two-dimensional gesture patterns to one-dimensional gesture patterns with additional sensory variables if available. For example, if the haptic device target is a linear array of transducers, it could convey the X-axis stroke but not the rise and fall of the Y-axis associated with the bell-curve. In that case, it may translate the bell-curve into a straight-line vector. However, if the linear haptic device also had variable transducer intensity, the Y-axis rise and fall may be transposed from spatial coordinates to transducer intensity. For example, as the bell-curve gesture rose above the X-axis (e.g., increasing Y-axis value), the intensity of the active transducer increases. While on the downward slope of the bell-curve (negative Y-axis slope), the intensity of the active transducer falls.

An embodiment of the invention provides for recording a tactile telepresence session. The session includes an array of unique identifier values for transmitted gesture patterns. Each value in the array is linked to a timestamp value of when the unique identifier was transmitted from the local network to the remote network. The recorded audiovisual session content is embedded with the array whereby the tactile telepresence session may be played back, invoking both the recorded audiovisual session content in synchronization with the unique identifier values wherein the session playback is seen, heard, and felt by a recipient.

Yet another embodiment of the invention incorporates visual computer simulation in conjunction with the tactile experience. While there are advantages to the recipient feeling the haptic output, it is disembodied. For some recipients and applications, it is advantageous to visually simulate an object invoking the haptic output. To achieve this, a registration module operable on a computer processor is provided. The processor is communicatively coupled to an electronic surface sensor (e.g., a sensor glove or sensor sleeve) detecting tactile input and an optical motion capture camera recording spatial pose data of a body part imposing the tactile input upon the electronic surface sensor. The tactile input and spatial pose data are recorded to a first database store as a tactile-spatial gesture. A unique profile is assigned to the tactile-spatial gesture within the first database store. This profile archives both the visual and tactile aspects the action so it can be invoked programmatically without repeating the physical action.

The unique profile is directed to a remotely located recipient having an affixed haptic device and electronic visual display. The electronic visual display may be a two-dimensional screen, an AR headset, a VR headset, or a similar display rendering interface. The unique profile is received from the remote network and used to query the first database store from the remote network for the tactile-spatial gesture assigned to it. The tactile-spatial gesture is then applied to the haptic device (e.g., a haptic glove, sleeve or the like) and electronic visual display at the recipient whereby the recipient feels the tactile mechanical force and sees a simulated rendering of the body part (e.g., hand or other body part) applying it.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

This invention comprises tactile-visual systems and methods for social interactions between isolated users. One particular application is quarantined patients (e.g., those with COVID-19) and remote visitors such as loved ones, family members, friends, or volunteers. A primary goal is to provide the isolated patient and the remote visitors with a visual interaction augmented by touch—a perception of being touched for the isolated patient and a perception of touching for the remote visitors. For example, a loved one might be able to virtually stroke the patient's arm or head, or even squeeze the patient's hand. A simple realization might include tactile transducer "strips" placed on the patient, with two-way video via touch-sensitive tablets, where touching the visual image of the strips on the tablet results in tactile sensations on the patient's skin. A realization of this could make use of our Physical-Virtual Patient Bed (PVPB), developed under National Science Foundation (NSF) Award #1564065, to serve as a remote physical, visual, and tactile surrogate for the isolated patient.

The remote visitors see, hear, and touch the PVPB, while the isolated patient would see the remote visitors via video and would feel their touch interactions via the tactile transducer strips on their arms and head (for example). These interactive video, voice, and touch interactions provide additional comfort for both the isolated patient and the remote visitors. Additional embodiments and enhancements include 3D depth and viewing for the visitors and/or the patient, with possible 3D free space interaction (e.g., visitors wearing Augmented Reality head-mounted displays could reach out and touch a virtual version of the patient, and the patient would feel tactile sensations). The systems and methods could be used for any conditions giving rise to isolation, including for example, isolation due to geographical distance.

Figure 1:
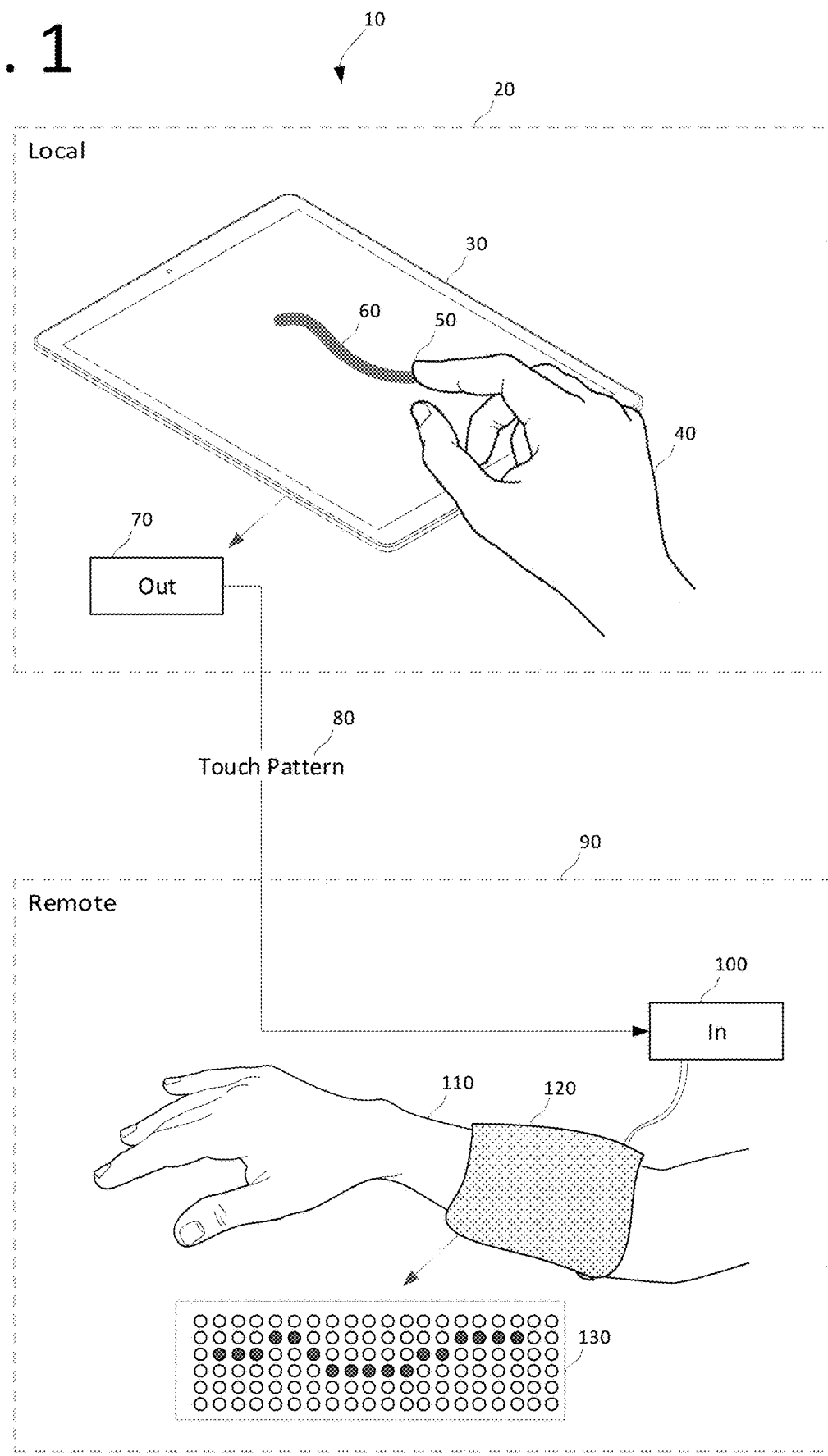
FIG. 1 is a diagrammatic view of an embodiment of the invention remotely conveying a first, single-finger touch pattern to a remote haptic transducer.

Turning to FIG. 1, an embodiment of the invention is denoted generally as reference numeral 10. Local network 20 is communicatively coupled to remote network 90. Touchscreen device 30 receives a first touch pattern 60 by user 40 depressing finger 50 onto touchscreen device 30 and scrolling downward.

Touchscreen device 30 displays first touch pattern 60 visually and also captures the onDown and onScroll events of the software operating touchscreen device 30. These include finger 50 depressing the surface of the device and the X- and Y-axis coordinate and velocity of first touch pattern 60. The touch pattern is sent to an output hub 70 and transmitted 80 to remote network 90. On remote network 90, touch gesture 60 is received by input hub 100, which then translates touch gesture 60 into haptic pattern 130, which is exacted through haptic sleeve 120 onto recipient arm 110.

Figure 2:
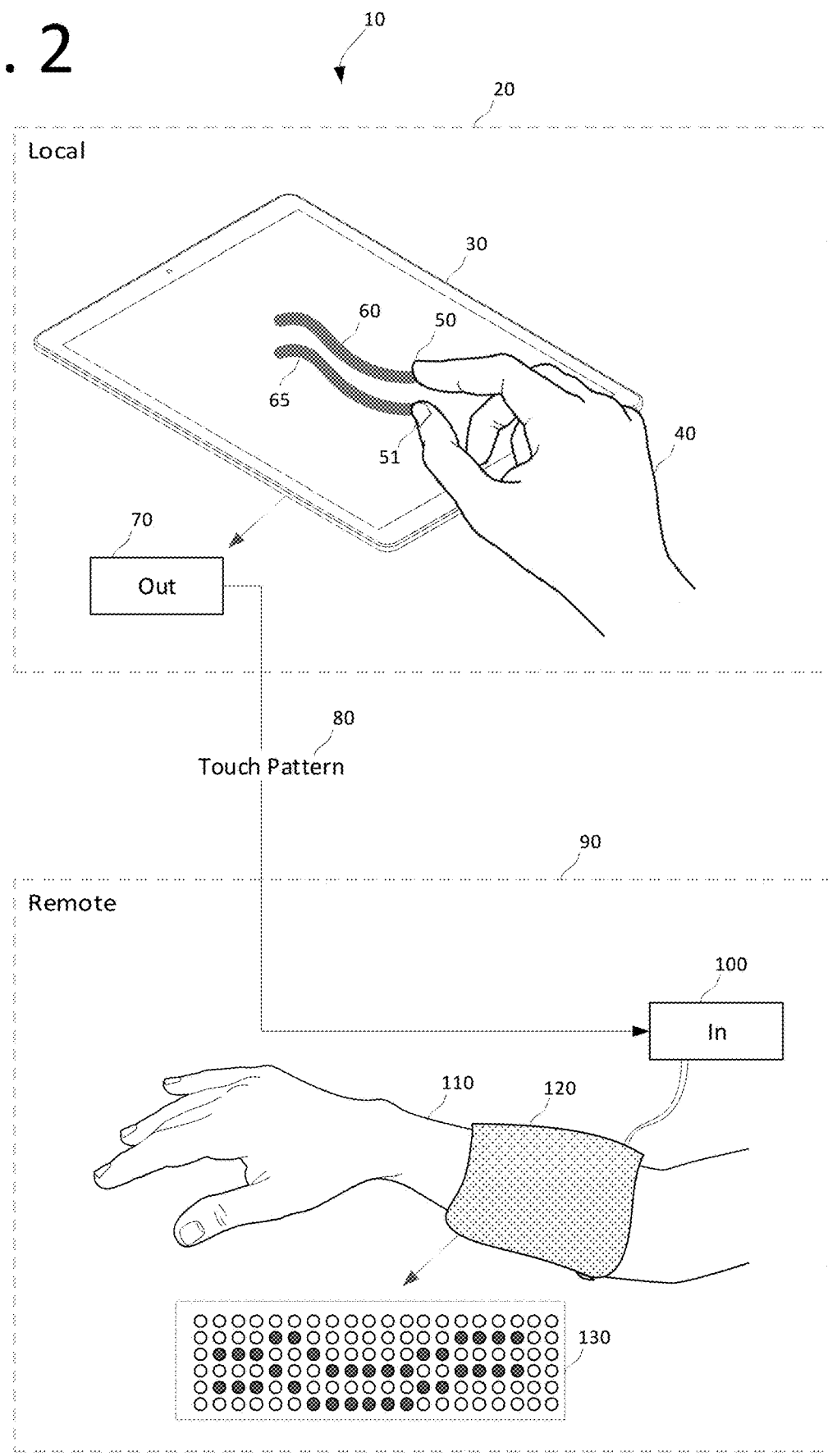
FIG. 2 is a diagrammatic view of an embodiment of the invention remotely conveying a second, two-finger touch pattern to a remote haptic transducer.

FIG. 2 shows a similar arrangement to FIG. 1 except user 40 executes a multi-finger touch pattern using thumb 51 which creates a second touch pattern 65 substantially parallel to first touch pattern 60. This second touch pattern 65 is registered into haptic pattern 130 in FIG. 2 and recipient arm 110 feels the two-finger touch pattern through haptic sleeve 120.

Figure 3:
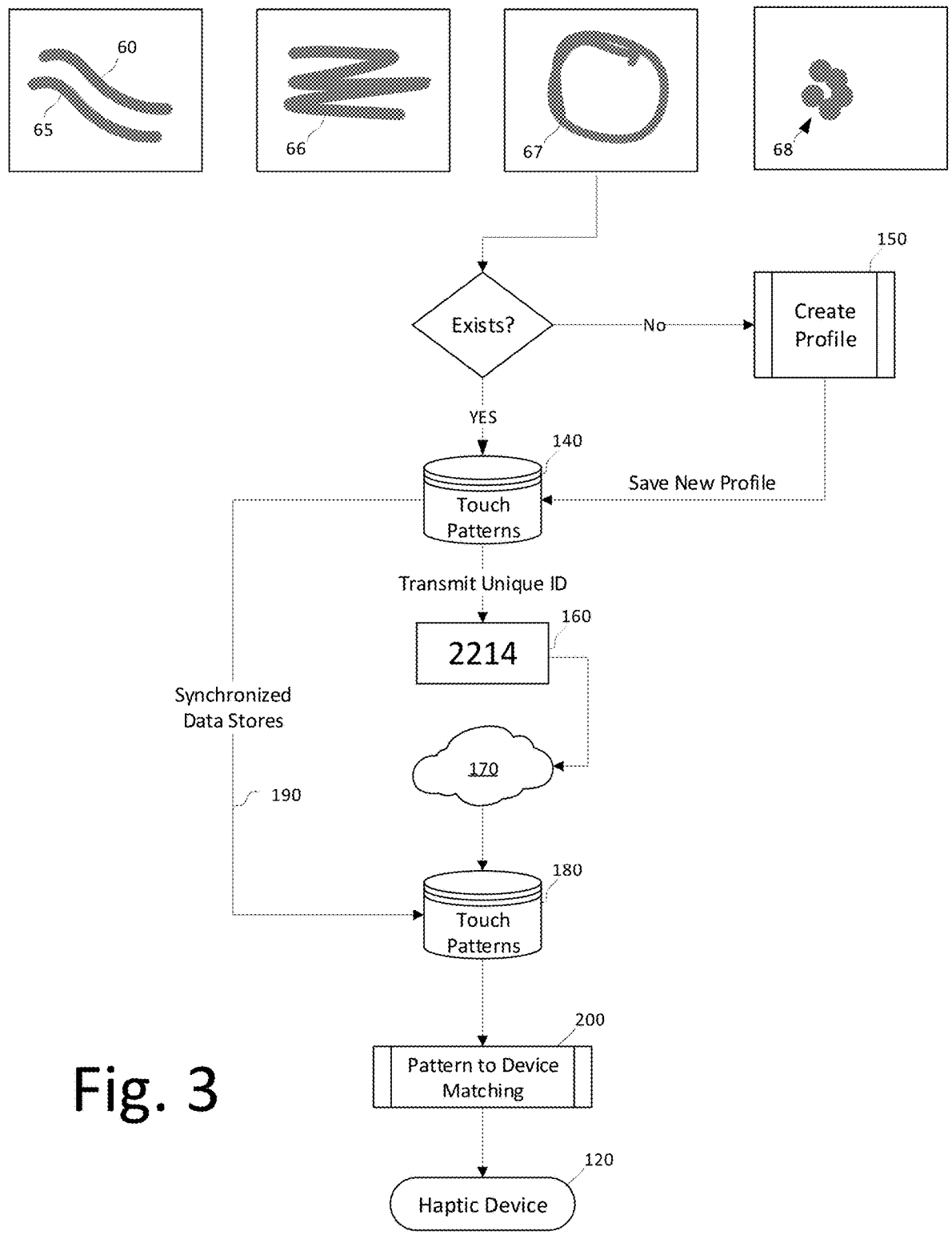
FIG. 3 is a diagrammatic view of an embodiment of the invention that catalogs touch patterns into unique profiles, which are then conveyed to a remote haptic device.

FIG. 3 shows an inventive concept of an embodiment of the invention to reduce latency between local touch "senders" and remote touch "recipients." Four touch patterns are shown, including parallel lines 60 and 65; zigzag 66; circle 67 and tapping 68. Pattern matching is done locally. In this example circle 67 is matched against a touch pattern first mirror database 140 in which is already exists as a common pattern shape. Within the first mirror database 140, circle 67 is identified by a primary key integer which is unique from all other stored pattern keys. Rather than transmitting a bitmap or vector of circle 67 from a local to a remote network, all that is needed is to transmit the primary key value 160 over the network connection 170. Aside from routine authorization and authentication traffic, sending a 32 or 64-bit integer (or GUID if desired) is highly terse and efficient. On the remote network, a second mirror database 180 stays in relative synchronization with first mirror database 140. Therefore, upon receipt of the primary key 160, a local (and efficient) lookup of the circle 67 touch pattern is performed. The pattern is then sent to a device matching module 200, which translates the vector pattern to a haptic output on haptic device 120. The device matching module 200 acts as a layer of abstraction between touch gestures, which may exceed the affordances of the haptic device and thus need to be mapped to the device capabilities as discussed further below.

Figure 4:
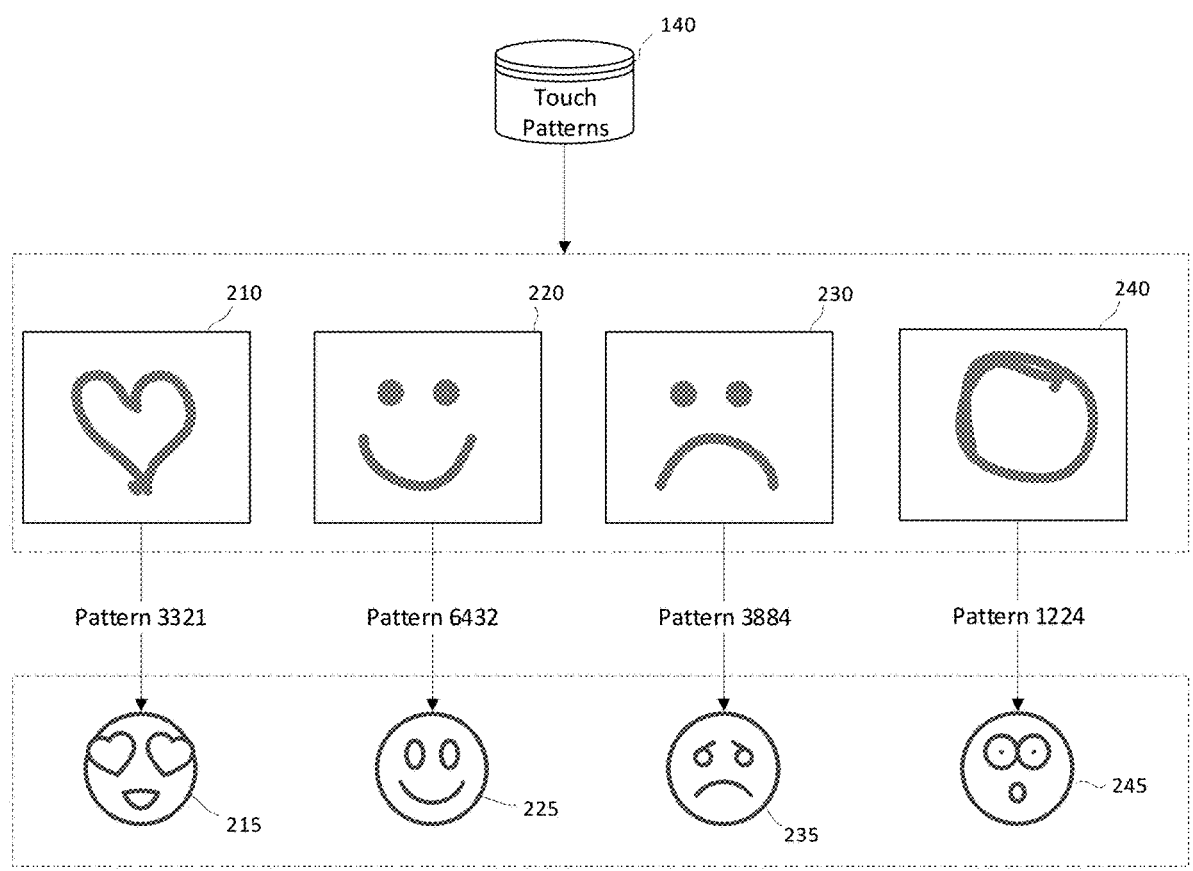
FIG. 4 is a diagrammatic view of an embodiment of the invention, cataloging a series of touch patterns into unique profiles and then maps them to visual indicia.
Figure 5:
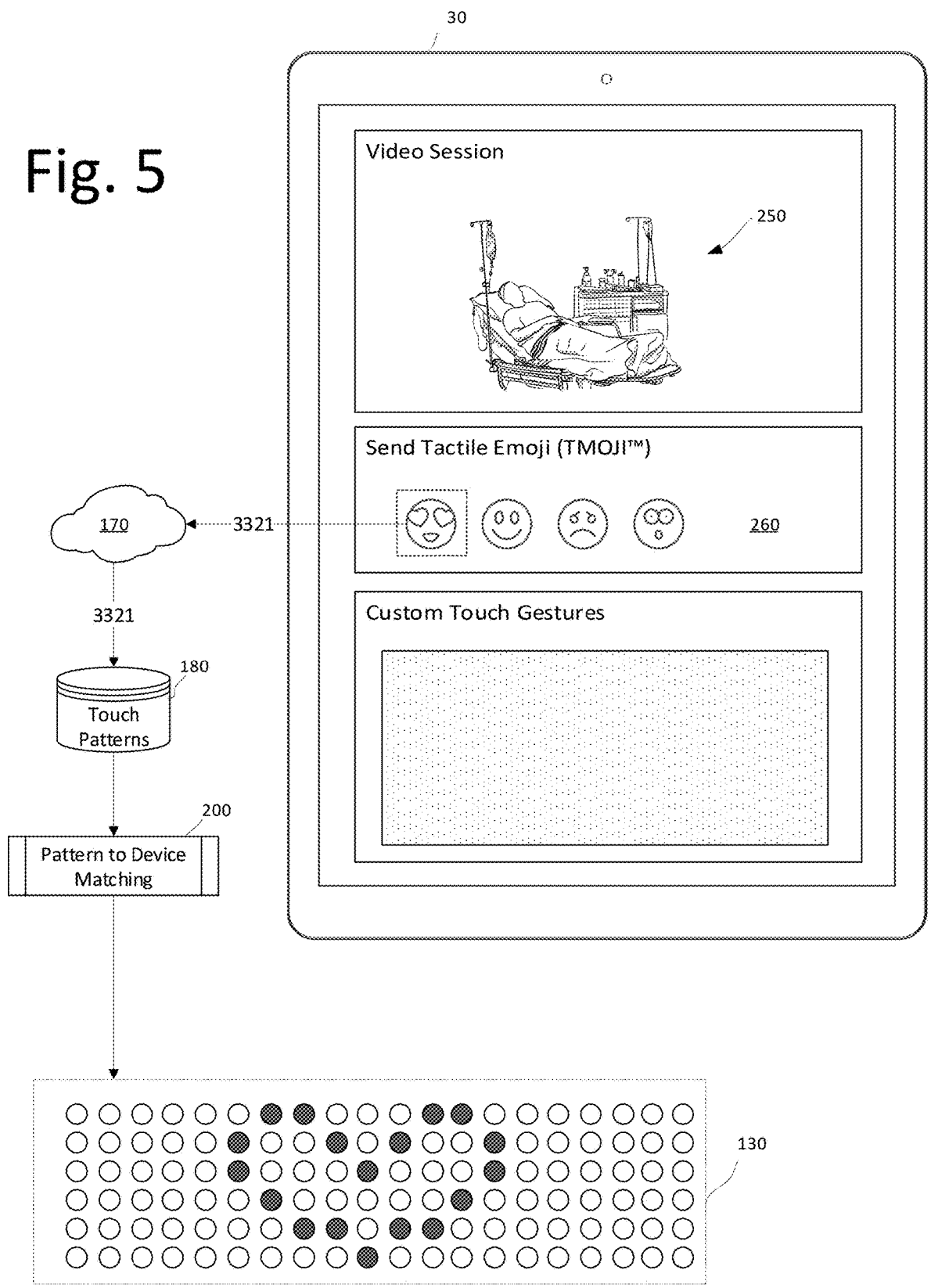
FIG. 5 is a partially diagrammatic view of a user interface allowing local users to send haptic touch instructions to a remote user by selecting a representative visual indicium.

FIG. 4 shows an embodiment of the invention referenced as TMOJI's by the inventors. In this embodiment, touch patterns stored in first mirror database 140 and represented by four-digit primary key integers are mapped to visual indicia (colloquially known as "emojis" or "emoticons"). A heart-shaped touch pattern 210 is mapped to TMOJI 215, which has hearts for eyes. A smiley face touch pattern 220 is mapped to TMOJI 225, which is a happy face. A sad face touch pattern 230 is mapped to TMOJI 235, which is likewise a sad face indicium. Not all indicia must be directly representative of the TMOJI, such as circle pattern 240 is mapped to TMOJI 245, which is an indicium conveying surprise. FIG. 5 shows an example of how the TMOJI function is deployed in an embodiment of the invention. A touch screen tablet 30 displays a user interface including a remote video session 250 of a recipient in a hospital room. A second interface panel 260 underneath video session 250 displays an array of TMOJIs which are assigned to "clickable events." This means upon selecting the indicium of the desired touch gesture, it is sent remotely to the recipient. In this case, TMOJI 215 from FIG. 4 is selected, which is assigned primary key integer 3321 within its event. Therefore, the primary key is immediately transmitted through network connect 170 to second mirror database 180, which has a cached copy of the touch pattern assigned to primary key 3321. The touch pattern is then rendered as haptic device pattern 130 as a heart shape. It is anticipated that other embodiments of the invention permit the user to create custom touch patterns and assign them to selectable or even custom indicia.

Figure 6:
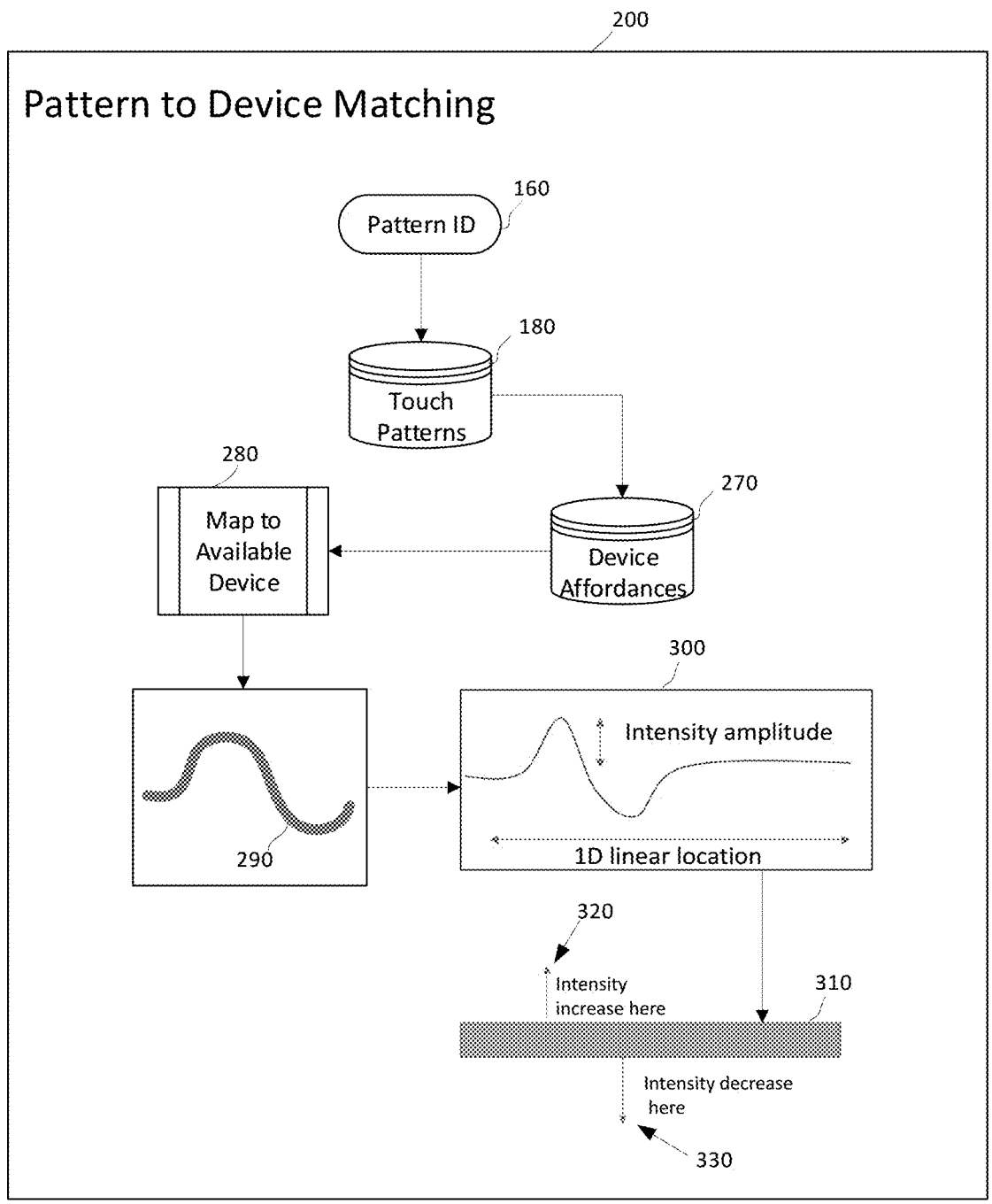
FIG. 6 is a diagrammatic view of an embodiment of the invention mapping a 2-dimensional touch pattern to a 1-dimensional haptic device.

FIG. 6 shows an aspect of the invention that accommodates haptic devices of different affordances to the same touch pattern. This is referenced as pattern-to-device matching 200. Certain haptic devices may provide either one- or two-dimensional fields of mechanical impact. Haptic devices may also vary in the adjustment of force. For example, some devices may impart a binary intensity to the haptic target, while others may impart different levels of intensity. In the example of FIG. 6, pattern ID 160 is received by second mirror database 180 to be imposed by a haptic device affixed to a recipient. However, the pattern is cross-referenced against device affordances 270 of the equipment used by the recipient. The pattern 290 is mapped 280 to the available device. In this case, pattern 290 is a curved stroke having both X- and Y-axis vectors. However, the target haptic device 310 in this example is only one-dimensional but has variable intensity. Accordingly, the device mapping translation 300 converts the positive Y-axis value into an increase 320 in haptic intensity and the negative Y-axis value into a decrease 330 in haptic intensity.

Figure 7:
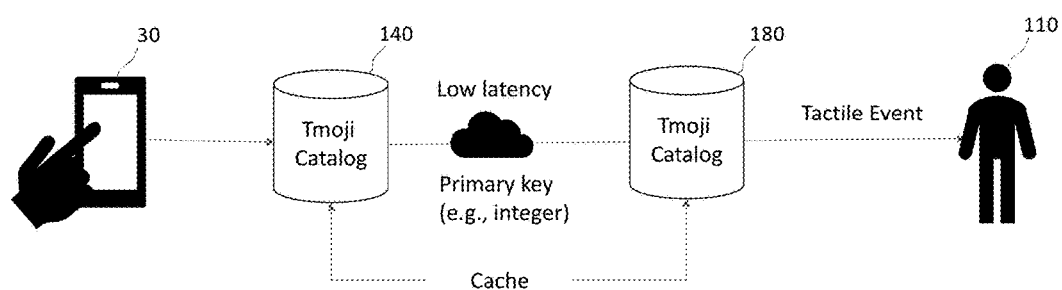
FIG. 7 is a diagrammatic view of an embodiment of the invention's high-efficiency communication pathway between local touch senders and remote haptic recipients.

FIG. 7 illustrates a simplified view of an embodiment of the invention wherein each touch pattern is stored in both the first and second mirror database 140 and 180 so that touch-to-haptic latency between local and remote locations is reduced as much as possible. While gesture recognition requires some pattern processing on the local side, using pre-cataloged TMOJI patterns requires virtually no algorithmic overhead. The TMOJI may include but not be limited to icons, images, text strings, or other type associations. Furthermore, an embodiment of the invention includes rendering speech to text wherein certain recognized keywords or phrase automatically invoke a remote touch gesture. For example, if the phrase "I love you" is recognized, then a haptic output associated with affection is registered with the recipient. In another example, if the phrases "hello," "excuse me," or "pardon me" are detected, then a light tapping gesture is sent haptically to recipient. In an alternative embodiment of the invention, the speech-to-text phrases associated with gestures produces a sorted list of recommended TMOJIs to be invoked towards the recipient.

Figure 8:
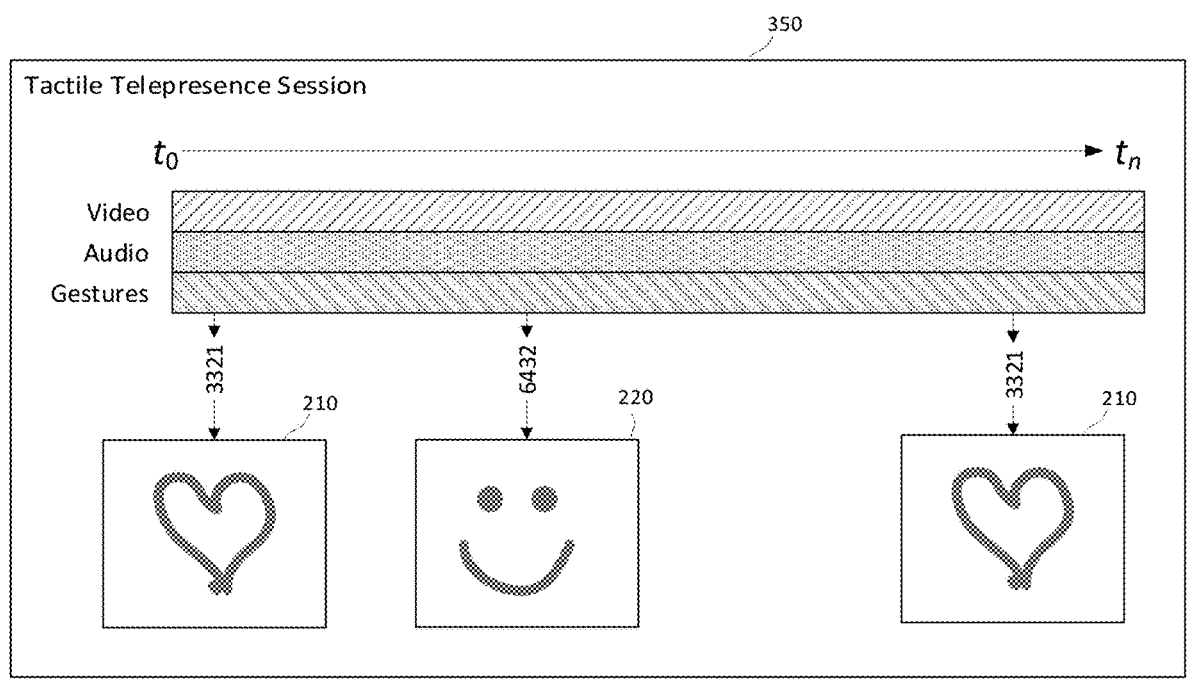
FIG. 8 is a diagrammatic view of an embodiment of the invention showing a time-code recording of a tactile telepresence session, which includes video, audio, and haptic output to the recipient.

FIG. 8 illustrates a time-code recording of a multimodal sensory session, including tactile experiences. TMOJIs values are saved with timestamps of their invocation on the recipient. As the TMOJI values are defined in a catalog of patterns, they are reproduced with exact fidelity in "playback" in association with the audio and video tracks. One application of this feature is in medical training. The touch patterns imposed upon a patient by a treating medical professional are recorded along with the audiovisual capture. Once the session is completed, the treating medical professional is then fitted with haptic devices and then "swaps places" with the patient and experiences his or her own treatment methodologies from the perspective of the patient.

Figure 9:
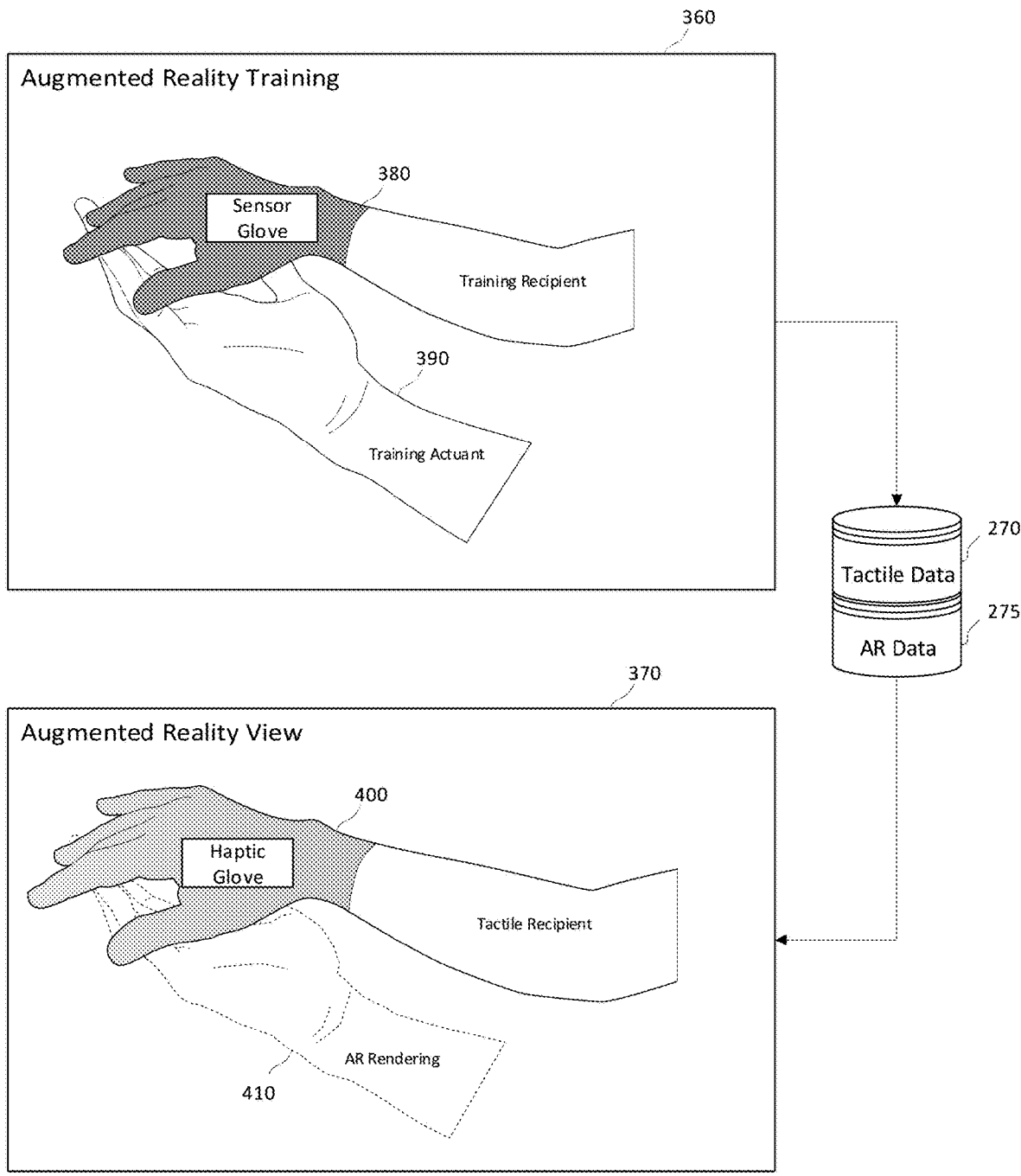
FIG. 9 is a diagrammatic view of an embodiment of the invention wherein touch patterns are synchronized with spatial pose data and then rendered remotely to the haptic recipient that both feels the touch pattern and sees a virtual object imposing the tactile sensation.

FIG. 9 illustrates an embodiment of the invention that integrates virtual reality (VR) and/or augmented reality (AR) into the system. In augmented reality training 360, a retaining recipient wears sensor glove 380, which records touch patterns invoked by training actuant 390 along with relative pose data of the training actuant 390 to sensor glove 380. In an augmented reality view 370, tactile data 270 and AR data 275 invoke haptic response upon haptic glove 400 and AR rendering 410, respectively. To assist in the simulation's spatial accuracy, sensor glove 380 (during training) and haptic glove 400 (during simulation) may have spatial reference indicia used to locate, orient, mask or overlay AR rendering 410. An alternative embodiment may replace augmented reality view 370 with a virtual reality view rather than rendering all viewable objects to the recipient. In the embodiment of FIG. 9, predetermined gestures, touch patterns, limb orientations, and the like may be abstracted into a catalog that is mirrored both locally and remotely. Thus, latency between invoking a touch gesture and receiving it remotely and haptically is reduced. Another advantage of this embodiment is that both sender and recipient may participate in the visual simulation in three dimensions instead of on a 2-dimensional video feed. Embodiment may include limbs rigged to a full anthropomorphic model (or service dog, etc. . . . ) or may alternatively have disembodied portions with transparent gradients to full opacity edges.

Figure 10:
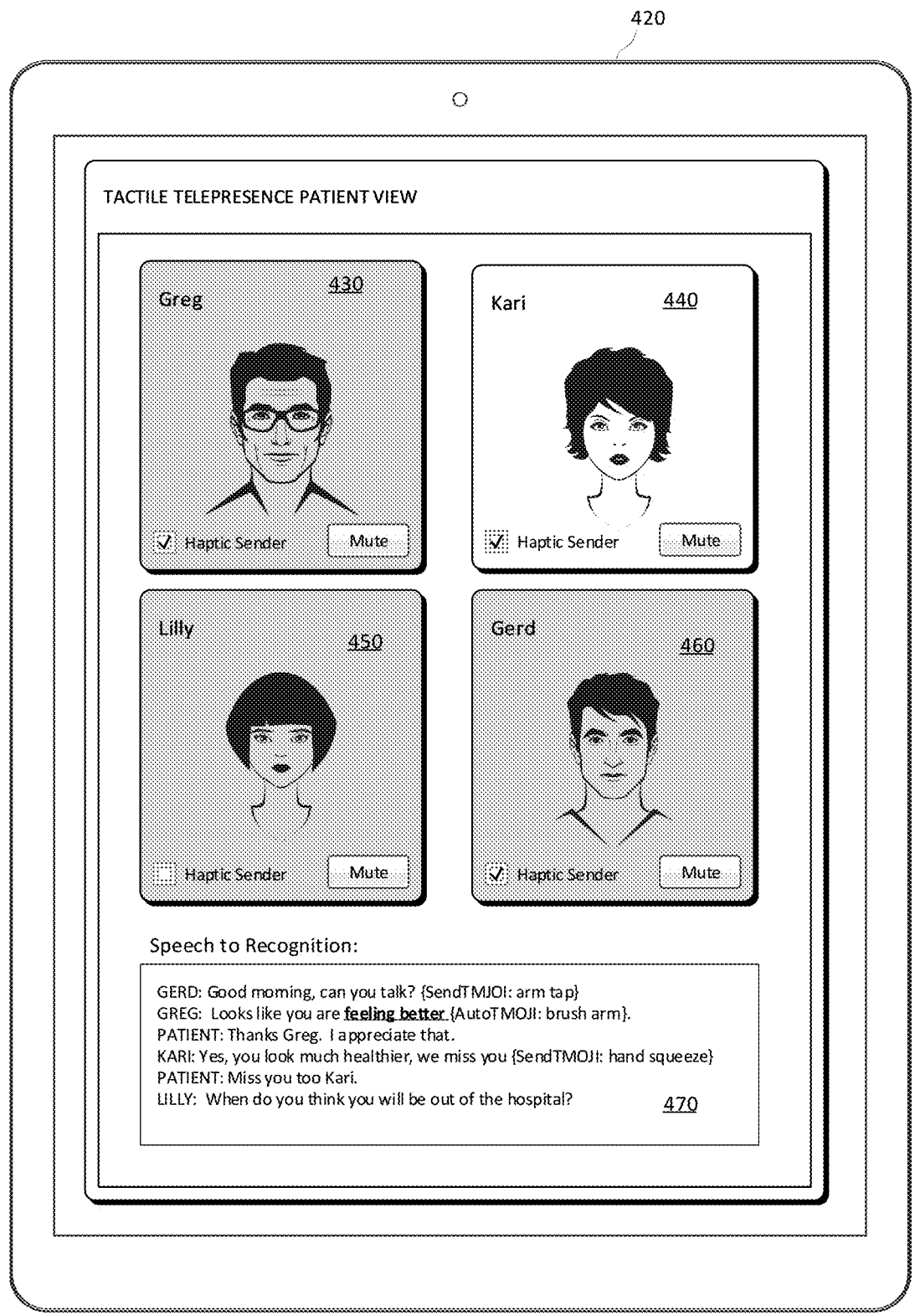
FIG. 10 is a graphic user interface of a remote video and tactile session from the tactile recipient view.

FIG. 10 illustrates an embodiment of the invention as a graphic user interface viewed from a haptic recipient perspective. In this case, a touchscreen tablet 420 shows an audiovisual/haptic session with four remote participants: Greg 430; Kari 440; Lilly 450, and Gerd 460. A speech-to-text function transcribes the audio into text in control 470. In the instant view, Kari 440 has "focus" as either the participant speaking and/or the participant sending a haptic event to the recipient. The recipient viewing the session sees that checkboxes are marked on Greg 430, Kari 440, and Gerd 460, which means they are capable and/or authorized to send haptic events to recipient. Lilly 450 does not have the "haptic sender" checked marked, which means she either does not have the requisite interface or authorization to send tactile output to recipient. The recipient also has "Mute" buttons available for each remote participant so unwanted haptic events may be suppressed if desired. Yet another feature illustrated in FIG. 10 is the mapping of text and/or speech to a TMOJI. In control 470, sent haptic events are denoted as either SendTMOJI, which means the haptic event was sent manually, or AutoTMOJI, which means the system automatically sent the haptic output to the recipient. In the example, the phrase "feeling better" is mapped to a TMOJI that automatically invokes the brush of the recipient's arm. Therefore, anytime the phrase "feeling better" is typed or recognized by speech processing, the haptic event fires, and the recipient feels the associated gesture pattern.

Yet another feature relating to FIG. 10 is the concept of focus preemption. For example, it would be confusing and detrimental if four (4) participants simultaneously sent haptic events to a recipient. Therefore, focus (shown to be with Kari 440) allows her and only her to send haptic events to recipient. The focus may be set with a participant by detecting speech, keyboard import, haptic event transmissions, or the like. Focus preemption may also prioritize one participant over another, such as a group leader or healthcare provider.

An embodiment of the invention also includes a pulse and respiratory feedback loop to determine which haptic events have a positive quantitative effect on the recipient alone or in conjunction with other stimuli. For example, certain phrases of sympathy, affection or encouragement may be optimally combined with haptic output to the recipient showing a reduction in blood pressure, pulse and/or respiration rate. Over a population of sessions, machine learning may process this data to derive the most effective automation of haptic output, including frequency, intensity, pattern, location, verbal association, and visual association. For example, a haptic recipient suffering from anxiety may view a two-dimensional video or even a three-dimensional immersive experience with a remote haptic sender wherein the haptic sender is fully or partially assisted by artificial intelligence (AI) to determine which haptic events to transmit under the context of the session in general or even specifically to a haptic recipient profile. These profiles may include elderly individuals, cognitive-limited individuals, anxiety-prone individuals, and the like.

In yet another embodiment, the feedback loop may be manually invoked by the haptic recipient wherein the recipient may select a control that they "like" or "do not like" the haptic event. It does not need to be binary; the feedback may be quantitative on a numeric scale. An embodiment of the invention also anticipates a haptic event threshold to avoid overstimulation. For example, the recipient could set a value that no more than three (3) haptic events occur within a minute.

Additional Embodiments

With respect to touch, the patient side of the invention employs tactile transducers such as motors or magnetic solenoid-based vibration units such as common in mobile devices. More advanced systems such as the "Taptic Engine" provided by APPLE could be employed. The invention includes aspects that make the attachment of the patient-side components (tactile transducers) unobtrusive with respect to the normal tubes and wires attached to a patient and designed for decontamination. Wireless operation is possible, but wired operation is preferred as radio transmissions can interfere with other exiting equipment. The patient-side transducers are incorporated into oleophobic or other appropriate cloth "sleeves" or "pockets" that can be decontaminated or discarded. The tactile devices, or the sleeves/pockets, are affixed to the patient via temporary medical tape, elastic bands, hook & loop material, or other similar means to maintain contact between the transducers and the patient's skin. Mounting points include, but are not limited to, the forearms, the forehead, the chest, the legs, and the hands.

With respect to touch, the visitor side (e.g., isolated family, friend, or provider) of the invention comprises a touch-sensitive tablet such as the APPLE IPAD, where—for example, Apple's FACETIME is modified to include the detection and transmission of touch per the invention. The system is employed with a large horizontally-mounted touch display such as the ANATOMAGE display or similar. The system is also employed with a physical-virtual patient bed. Any similar patient-sized "prone" display allows the visitors to stand around the "patient" (display), touching the patient's head, arms, etc., while the patient sees them talking, looking at them, and touching them. The visitor side could also include additional or alternate pressure-sensitive or compressible means for the visitors to "squeeze" or "hug" the patient. These include electrically actuated air bladders, electrically compressible bands, or other similar means. The system also includes the capability to recognize key spoke phrases on the visitor side and then automatically actuate touch or compression on the patient side. This speech recognition feature is usable with a conventional voice-only telephone, e.g., a distant family member could call and talk to the patient, and spoken words are transformed into comforting touch effects on the patient.

Video on Patient Side

With respect to video, the patient side includes one or more 2D cameras arranged to capture video of the patient, e.g., arranged to look "down" on the patient in a centralized location between where family members would be standing if they were physically present. That camera (those cameras) would also be used to automatically detect the types, locations, and orientations of the patient-side tactile transducers with respect to the patient, so that the user interface (e.g., touch tablet or physical-virtual bed) could automatically display special interaction regions in the corresponding locations of the imagery of the isolated patient. Given this aspect of the invention, the patient-side transducer "strips" could even be moved during use, and the visitor-side interface would—after some processing—reflect the new location and orientation. Similarly, tactile "strips" could be added or removed during operation of the system, and it would automatically adjust the visitor-side interface, etc. Other embodiments extend the 2D video to 3D telepresence, where for example the patient side would have a 3D depth sensor such as a MICROSOFT KINECT positioned to "look down" on the patient from a similar centralized perspective as the camera, and the 3D depth and imagery would be processed and transmitted to the family side so that they could move around while viewing the patient and see different perspectives. The patient could also wear an Augmented Reality (AR) head-mounted display so that they can see a virtual 3D representation of the visitors around their bed. If the visitors are wearing tactile gloves and the patient side is equipped with a 3D sensor such as a MICROSOFT KINECT, the patient could "touch" the visitors' virtual hands, and the visitors would feel a tactile sensation on their hands.

Video on Visitor Side

The visitor side includes dynamic 2D imagery (e.g., video) of the patient rendered on a touch-enabled tablet, a physical-virtual patient bed, or other means for displaying the patient to the family Ideally, if the display is life-sized and adaptable to a horizontal (prone) arrangement, two or more visitors stand around the "patient" while interacting with them (with the representation of the isolated patient). Other embodiments extend the 2D video to 3D telepresence, where for example, the family side would have a 3D depth sensor such as a MICROSOFT KINECT positioned to "look up" toward the visitors from a similar centralized perspective as the 2D camera, and the 3D depth and imagery would be processed and transmitted to the patient side, so that the patient could translate their head and see different perspectives. In addition, the visitors could wear augmented reality (AR) head-mounted displays so that they are able to see a virtual 3D representation of the patient in front of them. They may reach out and "touch" the virtual patient by positioning their hands in the locations of the visually indicated (in 3D free space) touch zones corresponding to the tactile devices on the patient, and tactile sensations would be transmitted to the patient side tactile transducers. The visitors could also be wearing tactile gloves (known in the art) so that they themselves get tactile feedback when they are "touching" the virtual patient. As indicated above, if the patient side is equipped with a 3D sensor such as the MICROSOFT KINECT, the patient could reach out and "touch" the virtual hands of the visitors, and if the visitors are wearing tactile gloves, they would feel a tactile sensation on their hands.

It could be that the patient is unable to move their head, in which case 2D video might suffice for them. In fact, a person of ordinary skill in the art would understand that various combinations of 2D/3D (depth), symmetric (the same on both sides), or asymmetric (different on each side) are possible for both the patient and visitor sides. Similarly, a person of ordinary skill in the art would understand that the tactile sensing and sensation (transducer) capabilities could vary in positioning and technological mechanism and could be symmetric or asymmetric in the configuration.

Both the patient side and the visitor side could (would likely) include some form of a processor to carry out the sensing, touch actuation, etc. Communicative coupling between the patient side components, the visitor side, and all components in between could be wired or wireless. It is noted that wireless communication might be preferred in some circumstances if it can be accomplished without interfering with other nearby medical (or other) equipment.

Both the visitor side and the patient side are operable by batteries, including rechargeable batteries, including rechargeable batteries that are inductively recharged such that, for example, simply placing the patient side components back in a specially-equipped charging case could initiate (and monitor and adapt) the charging of the components.

Both the patient and visitor sides may include the use of decontamination equipment such as that developed and sold presently by CLEANBOX to decontaminate components, including, for example, tactile transducers, HMDs, tactile gloves, and 3D depth sensors, as appropriate. Systems such as those by CLEANBOX, which employ UV-C light for decontamination, are used by hospitals and other institutions worldwide for similar decontamination purposes. Certain liquid solutions can also be applied to help reduce the adherence of viral/bacterial contaminants.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions, in fact, result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any non-transitory, tangible medium that can contain or store a program for use by or in connection with an instruction execution system, apparatus, or device. Storage and services may be on-premise or remote, such as in the "cloud" through vendors operating under the brands MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer-readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wireline, optical fiber cable, radiofrequency, etc., or any suitable combination of the foregoing. Machine-readable program code for carrying out operations for aspects of the present invention may be written in any combination of one or more programming languages, including an object-oriented programming language such as Java, C#, C++, Visual Basic, or the like and conventional procedural programming languages, such as the "C" programming language or similar programming languages. Additional languages may include scripting languages such as PYTHON, LUA, and PERL.

For communications, particularly to non-occupants, several wireless communication protocols may be used. For example, vehicle-to-vehicle (V2V) communication enables vehicles to wirelessly exchange information about their speed, location, and heading. V2V communication allows vehicles to broadcast and receive omni-directional messages, creating a 360-degree "awareness" of other vehicles in proximity. Vehicles, pedestrians, traffic control systems, cyclists, and others equipped with appropriate hardware and software use the messages from surrounding vehicles to determine navigational paths and hazards as they develop. The technology employs visual, tactile, and audible alerts—or a combination of these alerts—to warn occupants and non-occupants outside the vehicle. While initially planned as an ad hoc network, connectivity infrastructure, redundancy, and quality of service features permit centralized storage and processing. Alternatively, a hybrid environment of on-premise (vehicular ad hoc networks, VANETS) networks may be enhanced or supplemented by a centralized system through protocols under the brands or designations BLUETOOTH, 3G, 4G, 5G, WIFI, satellite or other wireless modalities.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Augmented Reality means technologies that superimpose a computer-generated image on a user's view of the real world, thus providing a composite view.

Avatar means an icon or figure representing a particular person in a computer simulation.

Gesture Pattern means one or more vector, speed and/or intensity values that are tactilely imparted through a haptic device to provide a touch sensation.

Haptic means perception and manipulation of objects using the senses of touch and proprioception.

Haptic Transducer means a wearable or affixable device that simulates tactile sensations of virtual objects.

Head Mounted Display (HMD) is a digital display device worn on the head or integrated into a helmet. An HMD may present a completely virtual reality environment or may also reflect projected images wherein a user may see through it in augmented reality environments. Some commercially available HMDs include those sold under the brands OCULUS RIFT and MICROSOFT HOLOLENS.

Tactile means of or connected with the sense of touch.

Tactile Glove means a sensor-packed glove wherein each sensor captures pressure signals as humans interact with objects.

Virtual Environment means the audio, visual, tactile, and other sensory features of a computer-generated simulation.

Virtual Human means a computer-generated, 2-dimensional, or 3-dimensional anthropomorphic character that conveys gestures, poses, interactions, and even audio consistent with a fully attentive, competent manual operator of a system that is otherwise autonomous or semi-autonomous with respect to an existent human observing the virtual human.

Virtual Reality means a computer-generated simulation of a three-dimensional image or environment that can be interacted with in a seemingly real or physical way by a person using special electronic equipment, such as a helmet with a screen inside or gloves fitted with sensors The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method, comprising:
   providing an electronic interface communicatively coupled to a local network, the electronic interface having a touchscreen input surface detecting tactile input by a user of the electronic interface;
   in response to detecting the tactile input, monitoring the input using a gesture recognizer;
   receiving a gesture pattern detected by the gesture recognizer;
   matching the gesture pattern to a unique profile within a first database catalog storing a plurality of gesture patterns, the first database catalog of gesture patterns communicatively coupled to the electronic interface;
   retrieving a unique identifier value for the unique profile from the database catalog;
   transmitting the unique identifier value from the local network to a remote network;
   on the remote network querying a second database catalog of gesture patterns with the unique identifier value, the first and second database catalogs configured in a mirrored state;
   retrieving from the second database catalog of gesture patterns, the same gesture pattern matched from the gesture recognizer on the electronic interface;
   sending the gesture pattern to a haptic device communicatively coupled to the remote network whereby the gesture pattern causes transducers on the haptic device to impart mechanical force upon a surface, the mechanical force matching the gesture pattern.

2. The method of claim 1 further comprising the step linking the unique identifier value of a gesture pattern with a visual indicium.

3. The method of claim 2 wherein the visual indicium is an icon.

4. The method of claim 2 further comprising the step of displaying the visual indicium as a selectable control on the touchscreen input service whereby selecting the visual indicium control transmits the linked unique identifier value to the remote network causing the gesture pattern of the linked unique identifier value to be invoked by the haptic device.

5. The method of claim 1 further comprising the step of linking the unique identifier value of the gesture pattern with a string of alphanumeric characters representing a human-readable message related to the gesture pattern.

6. The method of claim 5 wherein upon the electronic interface receiving input of the string representing a human-readable message related to the gesture pattern, the electronic interface transmits the linked unique identifier value to the remote network causing the gesture pattern of the linked unique identifier value to be invoked by the haptic device.

7. The method of claim 6 wherein the string is received by the electronic interface through a keyboard device or touchscreen keyboard emulator.

8. The method of claim 6 wherein the string is received by the electronic interface through speech to text transcription.

9. The method of claim 1 further comprising the step of providing a device normalization module on the remote network communicatively coupled to the haptic device, the normalization module storing the haptic device affordances, and mapping the gesture pattern to the haptic device capability.

10. The method of claim 9 wherein the module translates two-dimensional gesture patterns to a linear haptic device having an array of longitudinal transducers by converting the axis transverse to the longitudinal transducers from transverse axis positional values to transducer intensity values.

11. The method of claim 1 further comprising the step of recording a tactile telepresence session, the session including an array of unique identifier values for transmitted gesture patterns, each value in the array linked to a timestamp value of when the unique identifier was transmitted from the local network to the remote network.

12. The method of claim 11 further comprising the step of embedding recorded audiovisual session content with the array whereby the tactile telepresence session may be played back, invoking both the recorded audiovisual session content in synchronization with the unique identifier values wherein the session playback is seen, heard, and felt by a recipient.

* * * * *